Dec. 30, 1952     I. M. WHITE     2,623,395

CONE VALVE OPERATOR

Filed April 23, 1951     6 Sheets-Sheet 1

INVENTOR.
IRA MORGAN WHITE
BY

Dec. 30, 1952     I. M. WHITE     2,623,395
CONE VALVE OPERATOR
Filed April 23, 1951     6 Sheets-Sheet 2
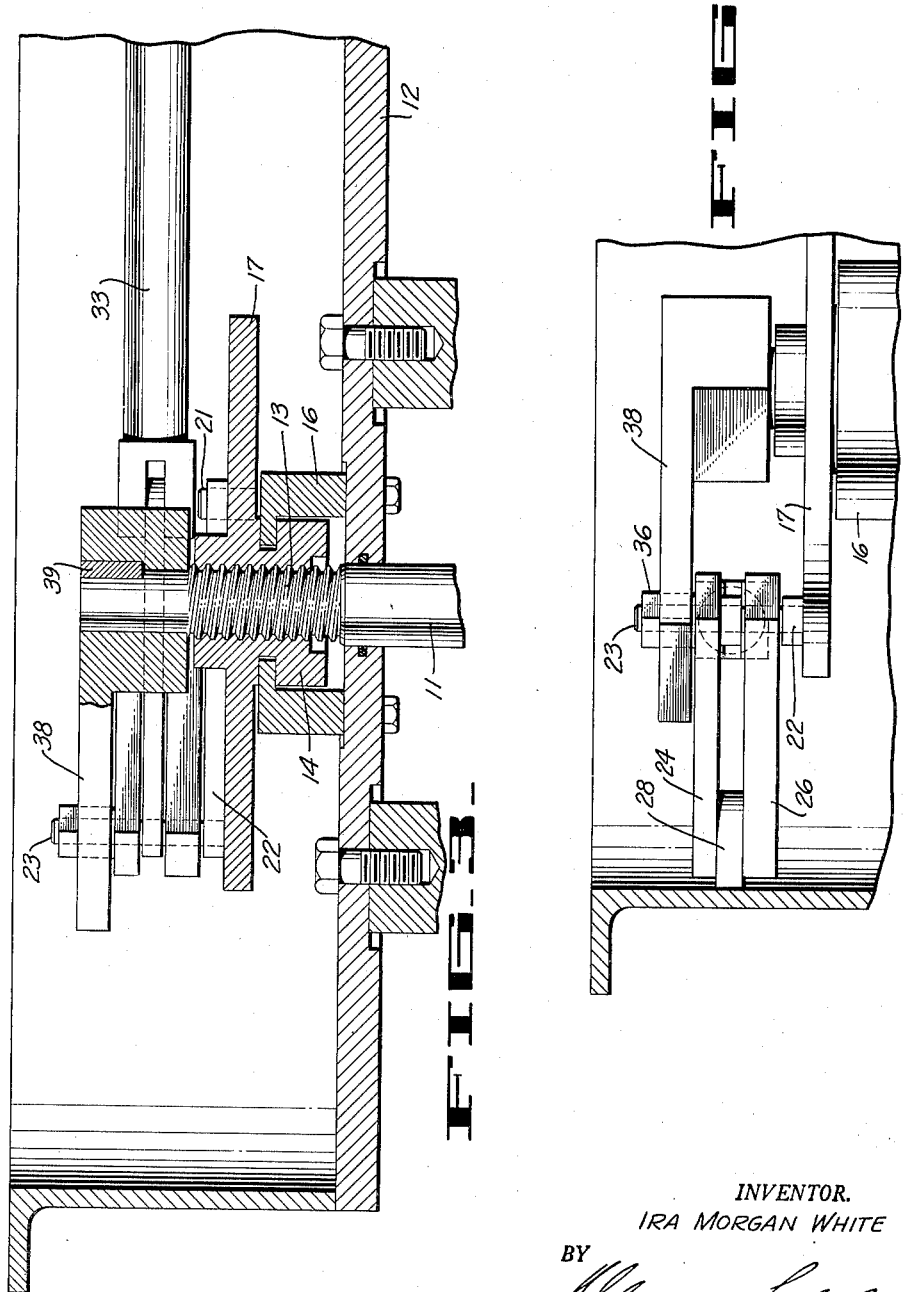
INVENTOR.
IRA MORGAN WHITE Dec. 30, 1952     I. M. WHITE     2,623,395
CONE VALVE OPERATOR Filed April 23, 1951     6 Sheets-Sheet 3

INVENTOR.
IRA MORGAN WHITE
BY

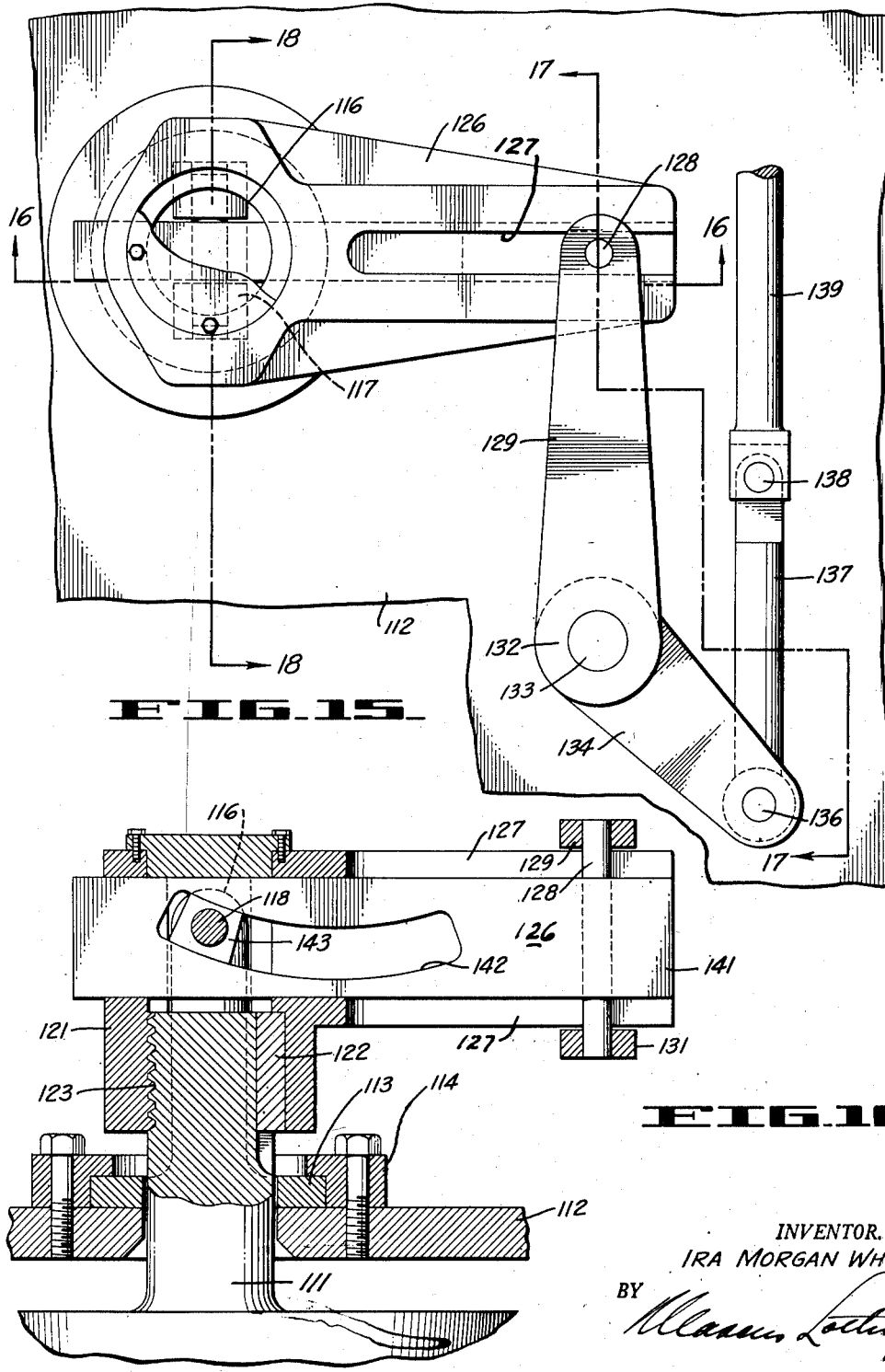

Dec. 30, 1952     I. M. WHITE     2,623,395
CONE VALVE OPERATOR

Filed April 23, 1951     6 Sheets-Sheet 6

INVENTOR.
IRA MORGAN WHITE

Patented Dec. 30, 1952

2,623,395

UNITED STATES PATENT OFFICE 2,623,395

CONE VALVE OPERATOR

Ira Morgan White, Berkeley, Calif., assignor to The Pelton Water Wheel Company, a corporation Application April 23, 1951, Serial No. 222,467

6 Claims. (Cl. 74—20)

My invention relates to means for actuating a cone valve, particularly a cone valve of large size. Cone valves include, usually, a truncated conical body mounted in a casing for rotation between open and closed positions and likewise mounted for axial translation toward and away from a seat in both open and closed positions. A valve of this general type is shown in the copending application of White and Bacchi, Serial Number 195,532, filed November 14, 1950, now Patent 2,565,640, issued August 28, 1951.

Cone valves are often utilized under operating conditions in which they must be tight when seated, either open or closed, yet must move freely between open and closed positions. There is available a group of devices effective to lift the cone from its seat, to rotate the cone, and then to reseat the cone in its new position. The lifting and lowering movement and the rotational movement are performed separately but under the influence of a single power actuator.

In accordance with the present arrangement, it is an object of the invention to provide a structure which simultaneously unseats and rotates the valve and simultaneously continues its rotation and seats it in its new position and also performs the reverse operation.

Another object of the invention is to provide a cone valve operator having a simple actuating mechanism for performing the desired motions of the valve body.

Another object of the invention is to provide a structure which is effective with a relatively small actuator to provide the sometimes large forces necessary to move the valve.

Another object of the invention is in general to provide an improved cone valve operator.

Other objects, together with the foregoing, are attained in the embodiment of the invention described in the accompanying description and illustrated in the accompanying drawings, in which Figure 1 is a plan of a cone valve operator with the casing cover removed.

Figure 3 is a cross section to an enlarged scale of the structure of Figure 1, the plane of section being indicated by the line 3—3 of Figure 1.

Figure 4 is an enlarged detail comparable to Figure 3 but showing the structure of Figure 1 in cross section, the plane of which is indicated by the line 4—4 of Figure 1.

Figure 1:
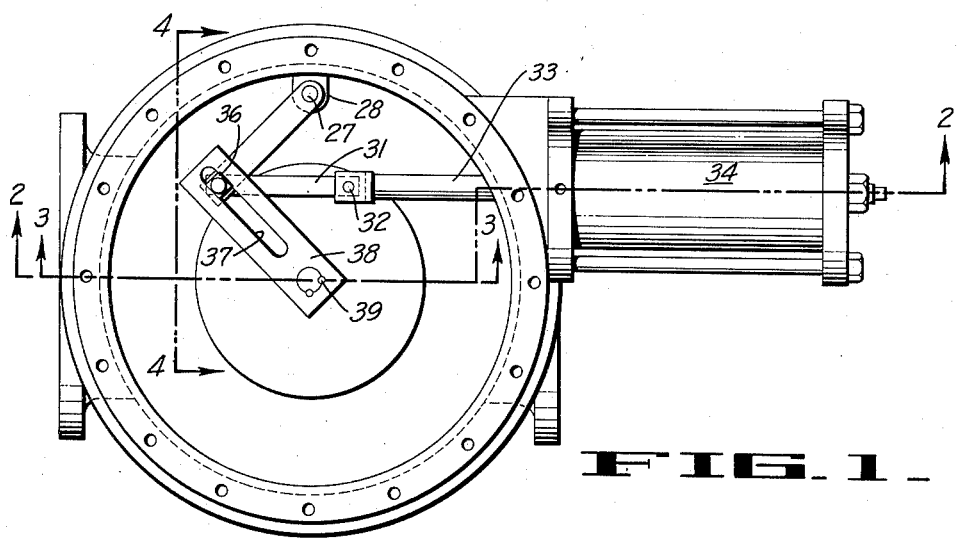
Figure 2:
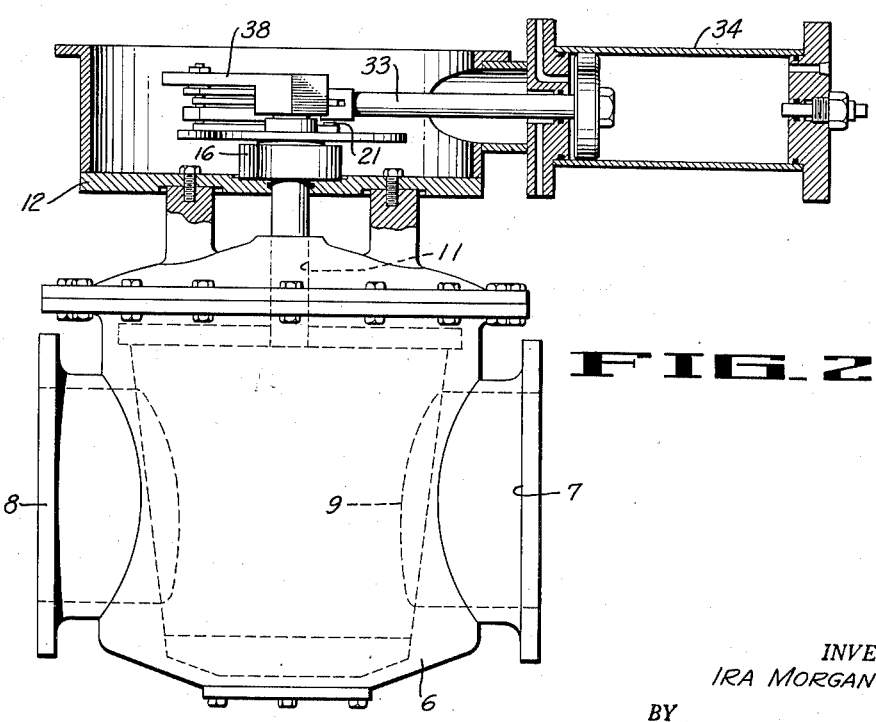
Figure 2 is in part a side elevation of the structure shown in Figure 1 and in part is a cross section, the planes of which are indicated by the lines 2—2 of Figure 1.

Figures 5 to 13, inclusive, the diagrammatic planes of the linkage mechanism of the Figure 1 device showing successive stages of operation of the structure between one extreme position and the other extreme position.

Figure 14:
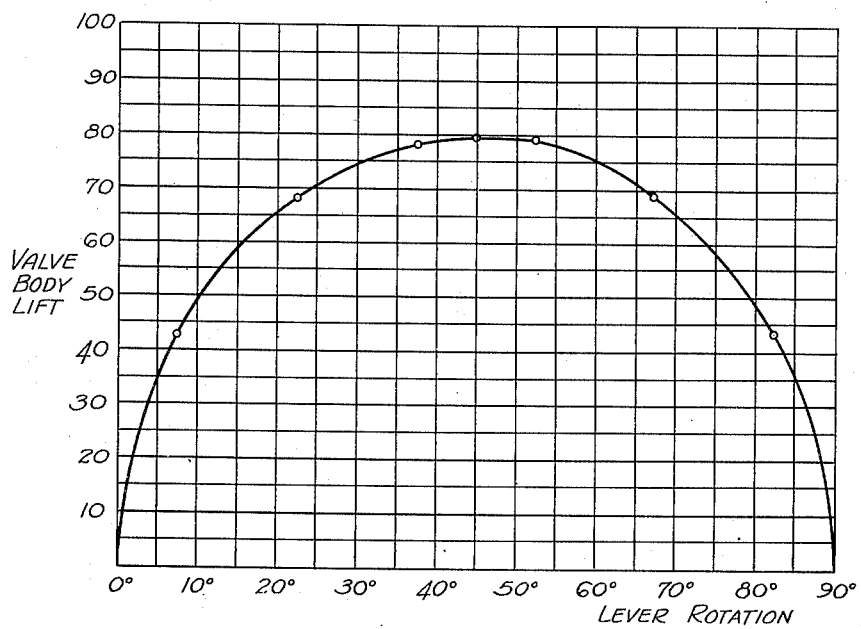

Figure 14 is a graph showing the motion relationship between the valve rotation and the valve axial movement between two extreme positions.

Figure 15 is a plan, with associated parts removed to reduce the size of the figure, of a modified form of linkage mechanism for the cone valve operator.

Figure 16 is a cross section, the plane of which is indicated by the line 16—16 of Figure 15.

Figure 17:
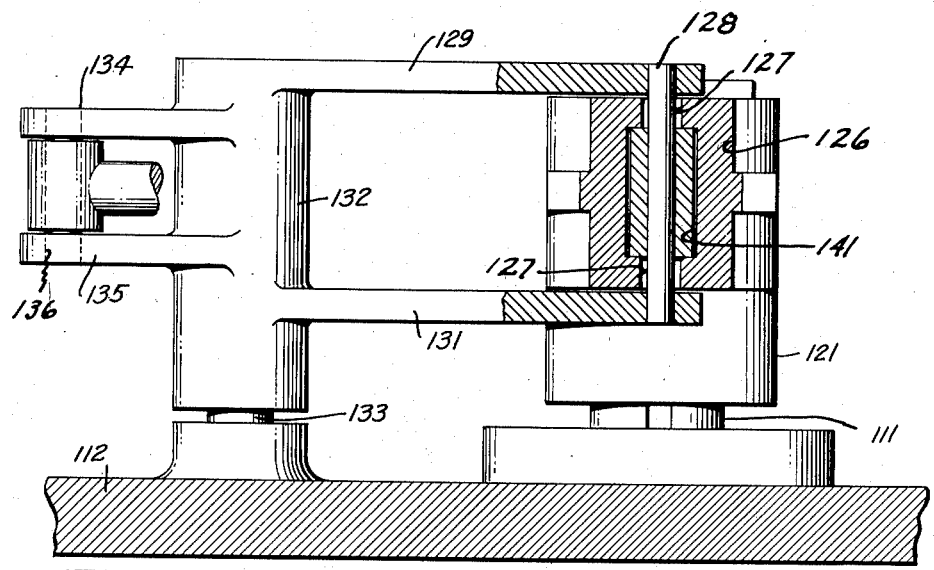

Figure 17 is a cross section, the planes of which are indicated by the lines 17—17 of Figure 15.

Figure 18:
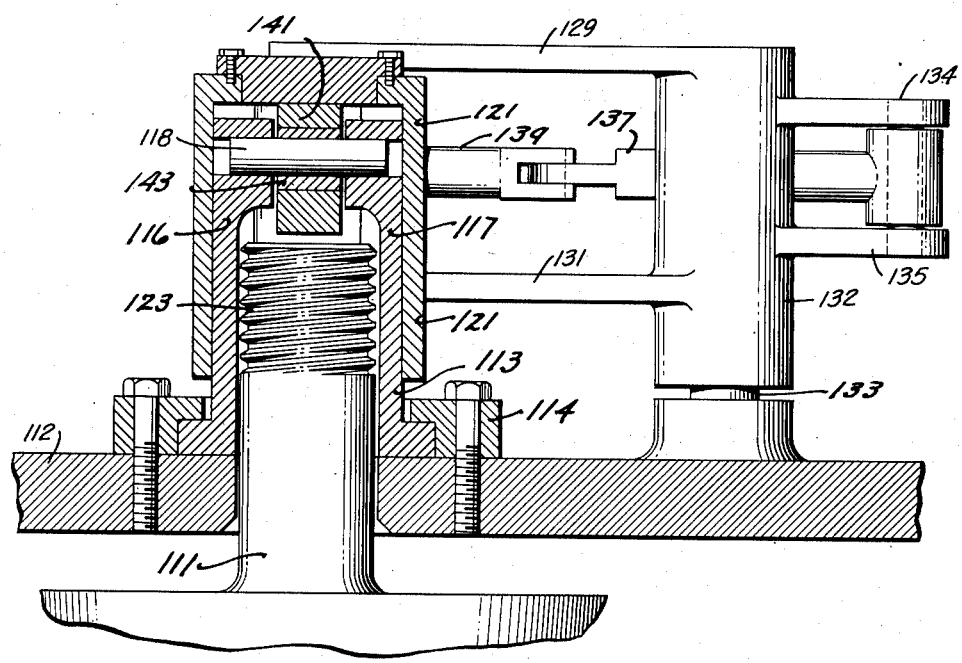

Figure 18 is a cross section, the plane of which is indicated by the line 18—18 of Figure 15.

In the form of the mechanism especially illustrated in Figures 1 to 4, there is provided a cone valve casing 6, having an inlet opening 7 and an outlet opening 8, and designed to be incorporated in a pipe line, for example, of large size operating under substantial pressure. Within the casing 6 is a valve body 9 of truncated conical configuration having an appropriate hydraulic passageway therethrough (not shown) in the customary fashion. Extending upwardly from the valve body 9 is a valve stem 11 designed for movement of a rotational and axially translatory character within the casing 6.

Mounted as an extension of the casing 6 is an actuator casing 12 within which the valve stem actuating mechanism is installed. As more particularly shown in Figures 3 and 4, the upper end of the valve stem 11 just after it passes into the casing 12 is provided with an inclined plane portion 13 constituting a thread in engagement with a similarly contoured nut 14. The nut is secured against axial translation but is mounted for rotation with respect to the casing by means of an anchor collar 16 secured to the casing 12.

The nut 14 is also provided with an extended disc 17 upstanding from which is an actuating pin 21. A link 22 extends from the actuating pin 21 to a pivotal connection with a rod 23. A pair of twin arms 24 and 26 not only are in engagement with the rod 23 but likewise are mounted by a pivot pin 27 in an appropriate boss 28 projecting from the wall of the casing 12. A pitman 31 engages the rod 23 and is also connected by a pivot 32 with a piston rod 33 extending from an appropriate hydraulic jack mechanism 34 mounted on the casing 12.

With the structure as so far described, actuation of the jack mechanism 34 translates the piston rod 33 and through the pitman 31 swings the twin arms 24 and 26 in an arc about the axis of the pin 27 as a center. The arcuate motion of the rod 23 moves or transfers the link 22 so that by means of the pin connection 21 the disc 17 and nut 14 are rotated and correspondingly through the inclined plane connection of the threads 13 lifts or lowers the valve stem 11 correspondingly.

In order simultaneously to rotate the valve stem with respect to the casing 12 and also with respect to the rotating nut 14, the rod 23 is extended to carry a square block 36 designed to rotate on the rod and to slide in a slot 37 formed in a lever 38 fastened on the stem 11 by a key 39. This connection is such that when the jack 34 is actuated and the piston rod 33 moves the arms 24 and 26 and swings the rod 23, the block 36 likewise slides in the slot 37 and causes a rotation of the lever 38 and correspondingly of the stem 11.

Since at the initial and final stations of the arms there is a right angle relationship between such arms and the lever 38, the first and last parts of the movement of the arms produce very little corresponding rotation of the lever 38 but during the intermediate portion of the motion the radius of the arms is great with respect to that of the path of the block 36 about the axis of the shaft 11 and a rapid relative rotation of the stem 11 results. The motion of the lever 38 occurs simultaneously with the rotation of the nut 14 which produces a lifting or lowering movement of the stem. Consequently, the lever 38 also rises or falls with regard to the block 36, which is extended axially for that reason.

Figure 5:
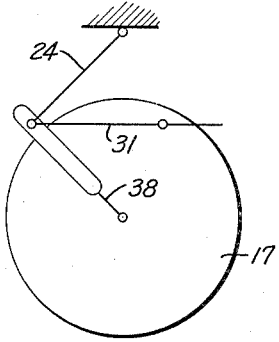
Figure 6:
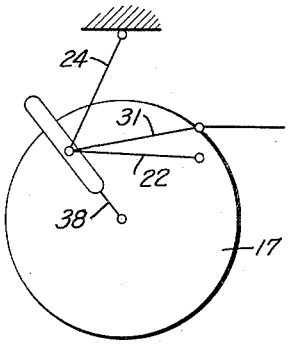
Figure 7:
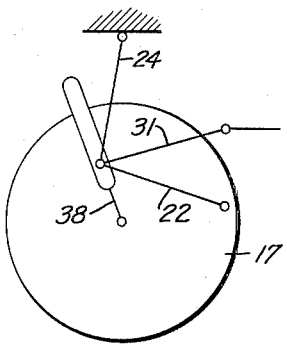
Figure 8:
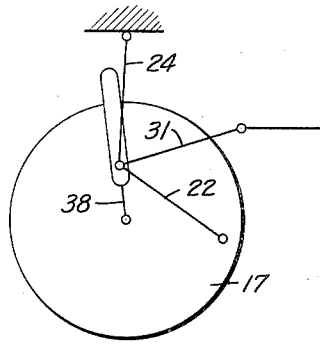
Figure 9:
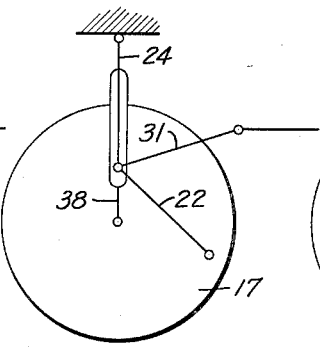
Figure 10:
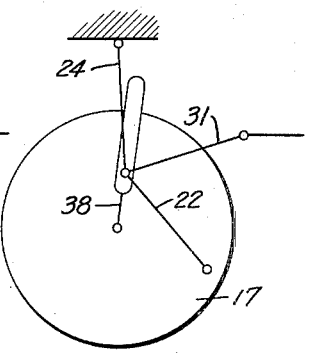
Figure 11:
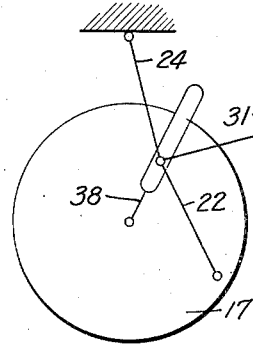
Figure 12:
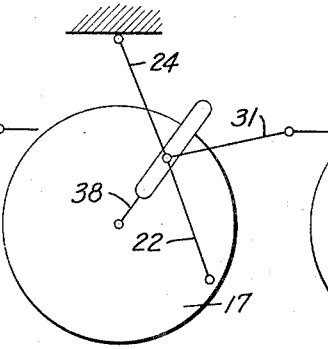
Figure 13:
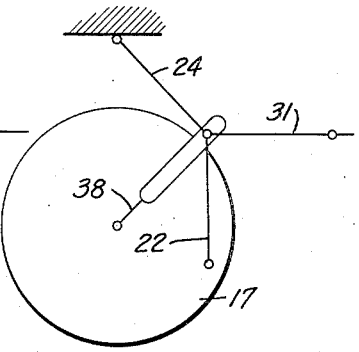

As particularly illustrated in Figures 5 to 13, as the arm 24, for example, revolves from its initial, Figure 5 station into its ultimate, Figure 13 station, it produces a rotation of the arm 38 and through the link 22 simultaneously produces a rotation of the disc 17. While these rotary movements are simultaneous, they are by no means necessarily of the same polar or angular extent. Since Figures 5 to 13, inclusive, are approximately to scale, they show the relative displacement of the lever 38 and the nut disc 17 in their actual values taking into account not only the simultaneous rotation of both of those elements with respect to the casing 12 but also taking into account the relative rotary movement between the valve stem 11 and the nut 14.

This relationship is plotted in Figure 14, approximately to scale, and shows as abscissae the extent of valve body lifting and lowering movement in an axial direction and to an arbitrary scale. As ordinates there is plotted the rotation of the valve stem 11 (and correspondingly of the valve body 9) in degrees with respect to the casing 8. The graph illustrates that the initial effect of the jack 34 is almost entirely to lift the valve body without substantial rotation although, at least theoretically, some rotation occurs. Toward the mid-point of actuation, the lifting of the valve body diminishes until it actually becomes zero at the time when the rotational movement of the valve body is half-way accomplished. Following this, the rotary component of the valve motion decreases until near the opposite extreme position it approaches zero as the valve body is lowered more and more rapidly toward its seated position in its new extreme location. The single actuating jack 34 and its connected mechanism produce a simultaneous unseating or lifting and rotation of the valve followed by a simultaneous rotation and seating or lowering of the valve. The structure gives the desired motion with relatively low loads and with great dependability.

In the form of the device shown particularly in Figures 15 to 18, inclusive, substantially the same general structure is employed. However, in this instance the valve casing 112 is provided with a valve stem 111. Encompassing the valve stem is a rotary standard 113 confined for rotation without axial movement by a flanged collar 114 secured to the casing 112. The standard 113 is provided with a pair of upwardly extending ears 116 and 117 adjacent their upper ends carrying a cross pin 118.

Encompassing the member 113 and the upstanding ears 116 and 117 is a hub 121 of appropriate contour. The hub 121 is engaged with the stem 111 not only by a key 122 for preventing relative rotation therebetween but is likewise engaged with the stem by partially complete threads 123. Because of the thread and key interconnection, the hub 121 and the stem 111 are locked and moved together both for axial translation and for rotational movement with respect to the casing 112.

The hub 121 is extended to form an integral, hollow lever 126 provided with radial slots 127. Operating or sliding within the slots is a rod 128. The rod in practice fits rather closely against the sides of the slots 127 but to illustrate the action, an exaggerated clearance is shown in the drawings. The rod 128 is mounted at the extremities of a pair of actuating levers 129 and 131 projecting from a hub 132 disposed on a pivot pin 133 mounted on the casing 112. The hub 132 is likewise provided with lever extensions 134 and 135 connected by a pivot pin 136 to a pitman 137. A pivot pin 138 joins the pitman to a piston rod 139 corresponding to the piston rod 33 and similarly forming part of an appropriate jack, not shown. As so far described, when the jack is actuated the piston rod 139 is translated, the pitman 137 then rotates the arms 129 and the rod 128 slides in the slots 127 being therefore effective to rotate the valve stem 111.

In order to provide a lifting and lowering movement of the valve stem concurrently with the rotary movement, the lever 126, being hollow, is utilized as a guide for a slide bar 141. At its outer end the slide bar is engaged with the rod 128 and adjacent its inner end is provided with a transverse, arcuate slot 142 generated about a center above the actuating mechanism. A block 143 is disposed in the arcuate slot 142 so that the block and the arcuate slot together constitute an inclined plane mechanism. The block 143 is centrally disposed with regard to the hub 121 and is engaged with the pin 118 secured in the upstanding ears 116 and 117.

When the arms 129 and 131 swing to rotate the lever 126, the rod 128 simultaneously translates the bar 141 with respect to the lever and by reason of the inclined plane interengagement between the walls 142 and the block 143 is effective to move the valve stem 111 with regard to the upright ears 116 and 117, thus axially translating the valve stem 111 with respect to the casing 112 at the same time that the valve stem is being rotated. The extent of inclination and the direction of inclination of the slot 142 are such that the valve body is moved in an appropriate direction.

Some valve bodies taper upwardly toward the actuating mechanism and other valve bodies taper downwardly away from the actuating mechanism so that the stem is either lifted or lowered initially as the rotation begins. The contours of the slot 142 and of the block 143 are designed to produce the appropriate direction of translation. Furthermore, the center of the arcuate slot 142 is located somewhat off of the axis of the shaft 111. This produces an initial translation of the shaft in one direction and then toward the intermediate part of the rotation, the shaft may partly be restored or returned toward its seated position. This is for the purpose of getting a more abrupt unseating and reseating movement of the stem for a given amount of rotation. The inclination of the slot 142, however, is such that the intermediate approach toward reseated position is not sufficient actually to cause contact between the valve body and its casing. If this motion were illustrated in Figure 14, it would be represented by somewhat steeper sides of the curve adjacent the extreme position and by a smooth dip downwardly toward the base adjacent the center part of the rotary movement.

In both forms of the device illustrated herein there is provided a cone valve actuating mechanism effective to produce simultaneous rotation and axial translation of the cone through the medium of an inclined plane structure, either of a thread and nut type or of a slot and block type.

What is claimed is:

1. A cone valve operator comprising a casing, a valve stem rotatably and axially movable in said casing, an actuating lever pivoted on said casing, means for pivotally moving said lever on said casing, a first mechanical connection between said valve stem and said actuating lever for rotating said valve stem in accordance with the rotation of said actuating lever, said first mechanical connection including a hollow lever with a straight slot therein and a pin on said actuating lever disposed in said slot, and a second mechanical connection between said valve stem and said actuating lever for moving said valve stem axially in accordance with said rotation of said actuating lever, said second mechanical connection including a slide bar slidable within said hollow member and engaging said pin on said actuating lever.

2. A cone valve operator comprising a casing, a valve stem rotatably and axially movable in said casing, an actuating lever pivoted on said casing, a pin on said lever, means for pivotally moving said lever on said casing, a hollow member engaging said pin and connected to said valve stem for rotating said valve stem, and a slide bar slidable within said hollow member engaging said pin and connected to said valve stem for moving said valve stem axially.

3. A cone valve operator comprising a casing, a valve stem rotatably and axially movable in said casing, an actuating lever pivoted on said casing, a pin on said lever, a second lever on said valve stem, means including a straight slot in said second lever for interconnecting said pin and said second lever, a standard engaging said stem and mounted for rotation on said casing, and a link slidable relative to said second lever and engaging said pin and movable relative to said standard for moving said stem axially.

4. A cone valve operator comprising a casing, a valve stem rotatably and axially movable in said casing, a lever pivotally mounted on said casing, means for swinging said lever, a pin mounted on said lever, a second lever secured to said stem and having a radial slot for receiving said pin, a slide rotatably engaging said pin and slidable with respect to said second lever, a standard surrounding said stem and mounted for rotation on said casing, and means engaging said slide and said standard for moving said stem axially.

5. A cone valve operator comprising a casing, a valve stem rotatably and axially movable in said casing, a lever pivotally mounted on said casing, a hydraulic cylinder and piston for actuating said lever, a pin mounted on said lever, a second lever secured to said stem and having a radial slot for accommodating said pin, a slide bar engaging said pin and slidably disposed relative to said second lever, said slide bar having a slot therein, a standard surrounding said stem and mounted for rotation on said casing, a pin on said standard, and a block journalled on said pin and disposed in said slot in said slide bar.

6. A cone valve operator comprising a casing, a valve stem rotatably and axially movable in said casing, a first lever mounted on said casing to pivot about an axis parallel to said valve stem, means for pivoting said first lever about said axis, a hollow lever on said valve stem, means including a slide bar within said hollow lever for interconnecting said first lever and said hollow lever for conjoint movement, and means dependent upon relative sliding movement between said slide bar and said hollow lever for axially moving said valve stem relative to said casing.

IRA MORGAN WHITE.

REFERENCES CITED

The following references are of record in the file of this patent:

UNITED STATES PATENTS

| Number | Name | Date |
| --- | --- | --- |
| 1,073,075 | Keck | Sept. 9, 1913 |
| 2,034,291 | Gannestad | Mar. 17, 1936 |
| 2,166,840 | Goldberg | July 18, 1939 |
| 2,243,845 | Goit et al. | June 3, 1941 |